United States Patent Office 3,432,346
Patented Mar. 11, 1969

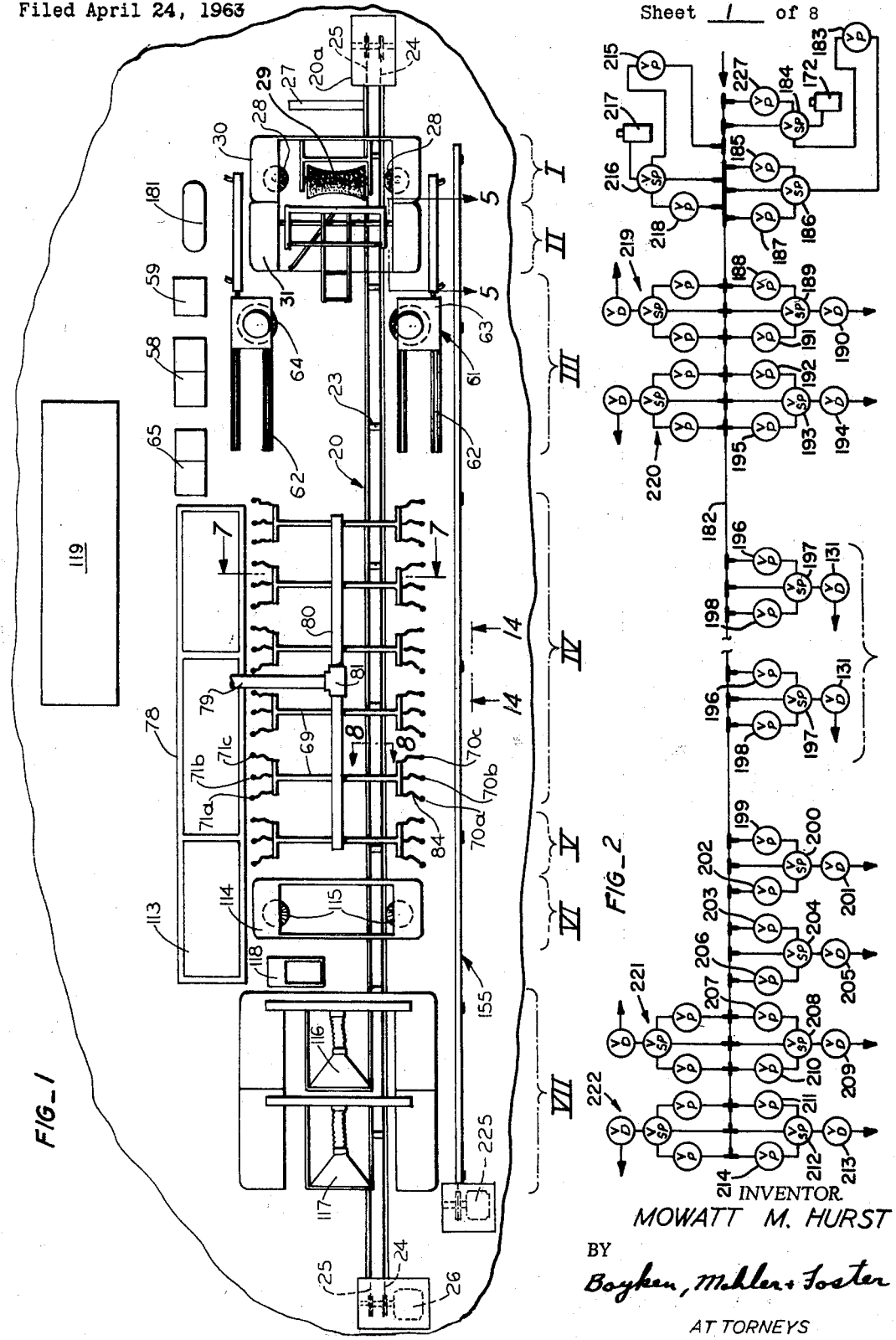

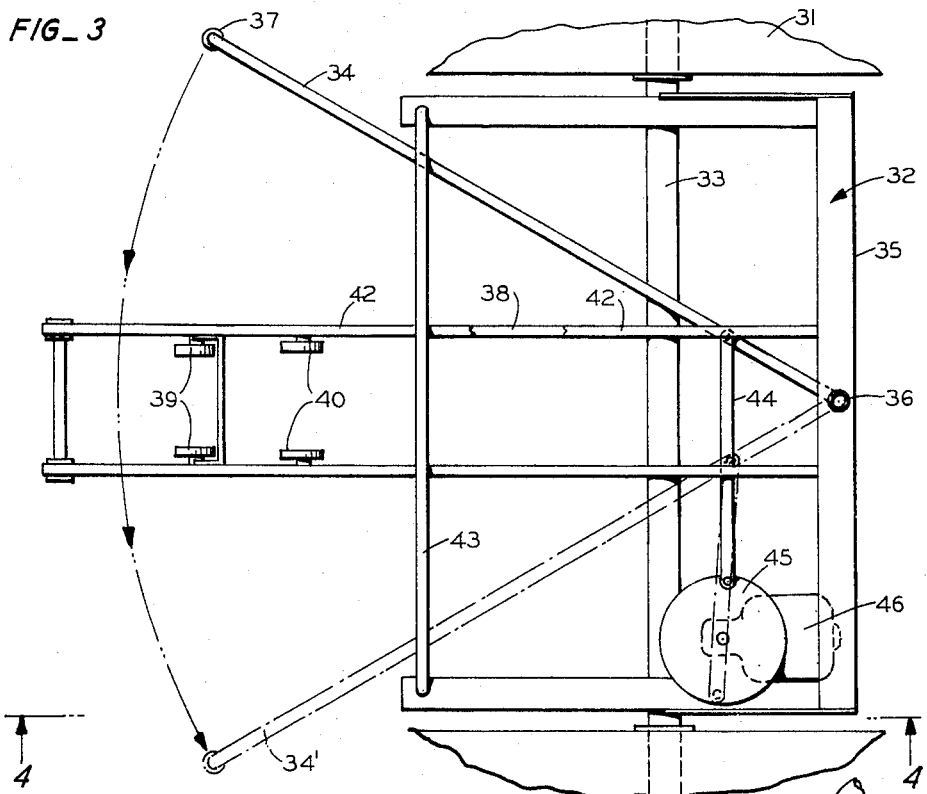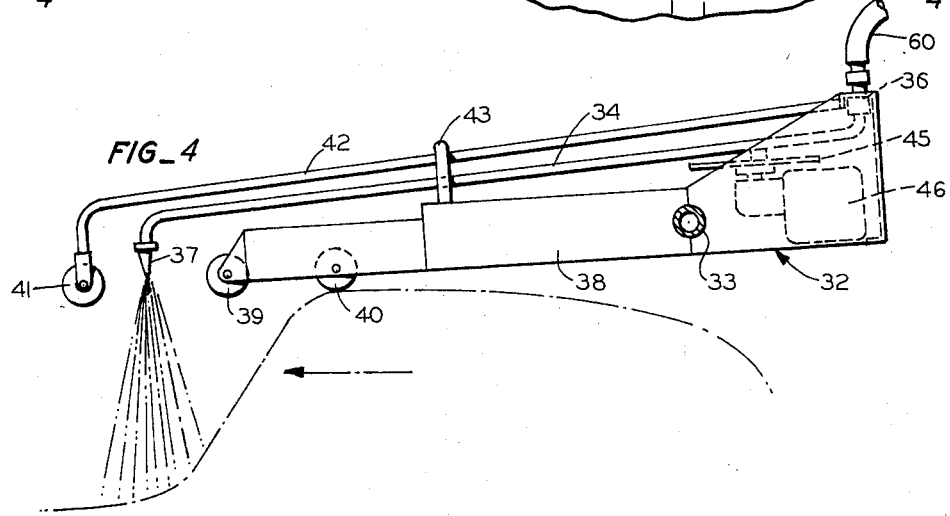

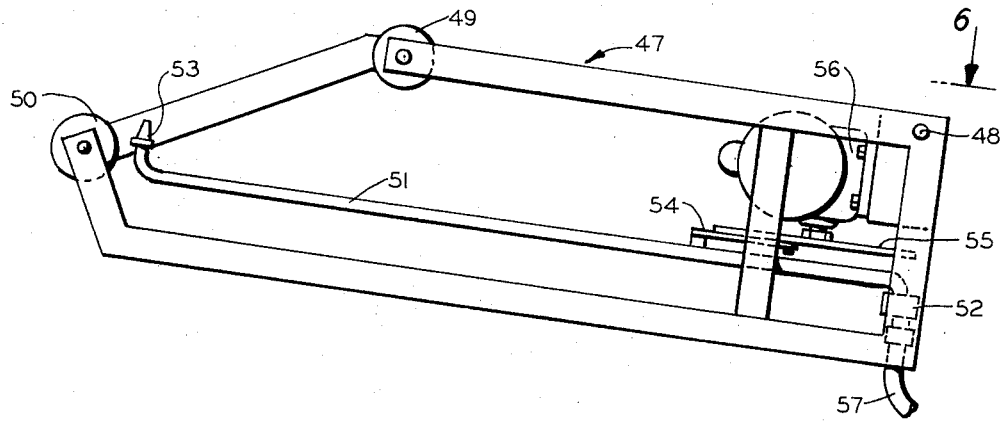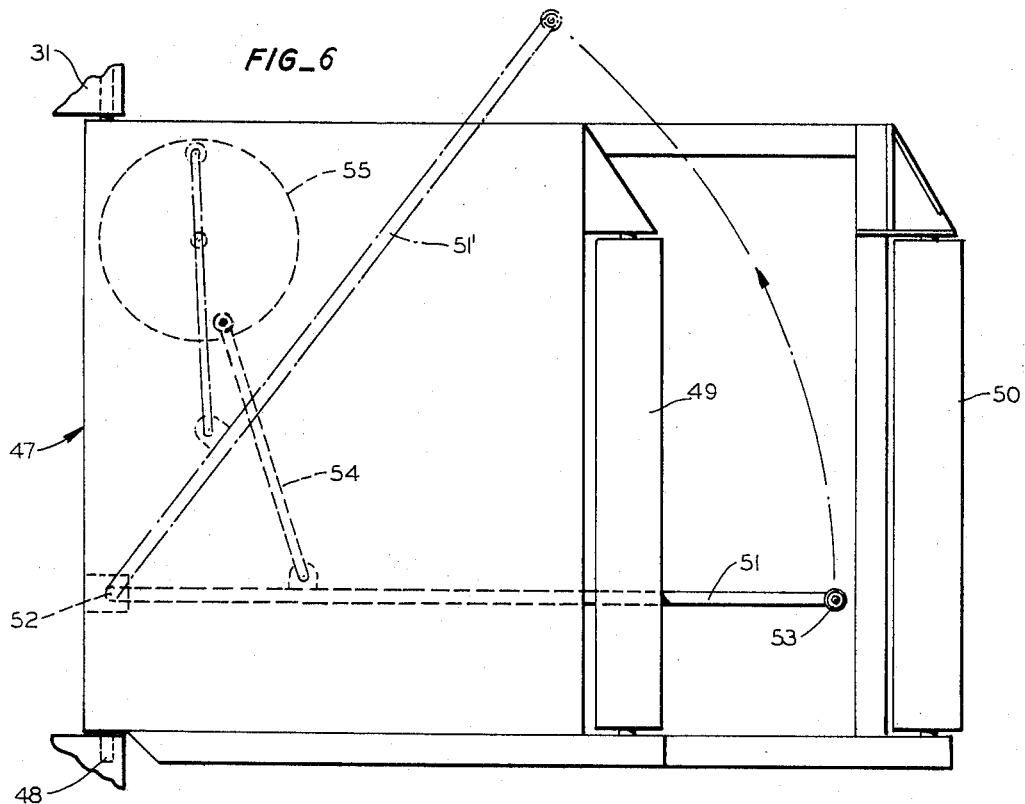

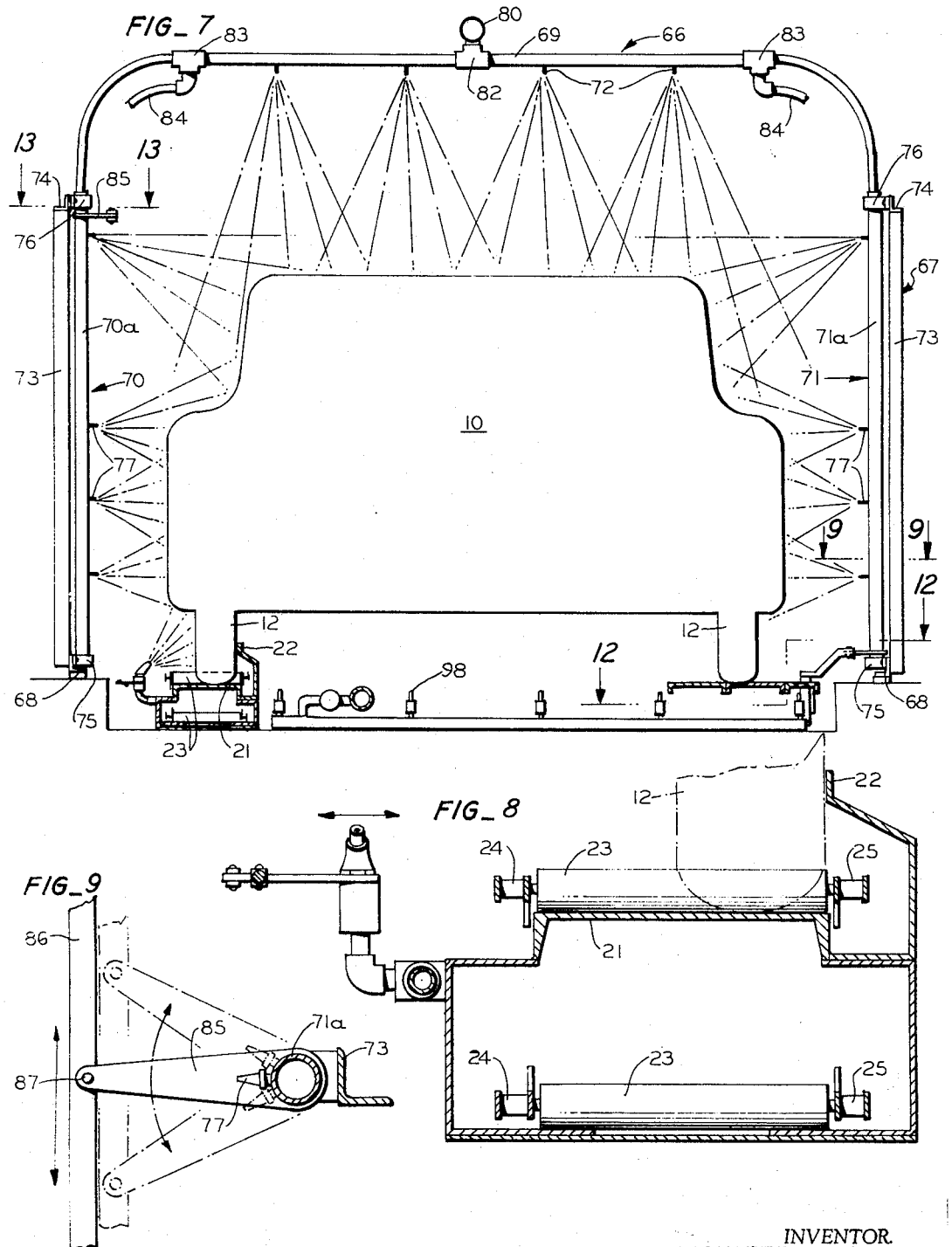

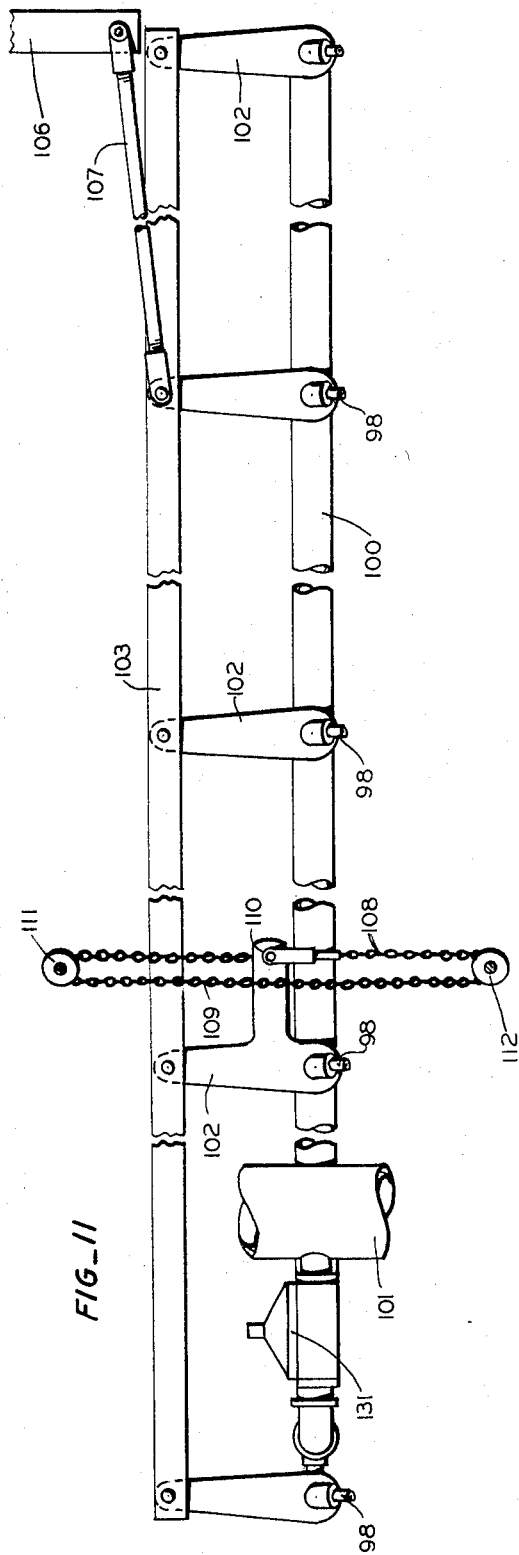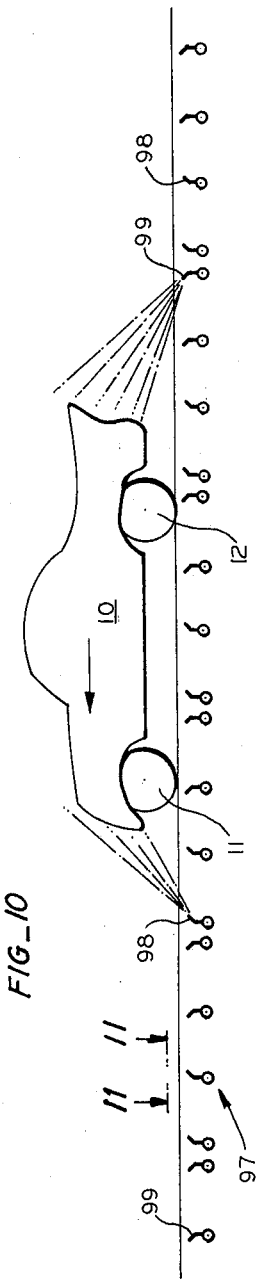

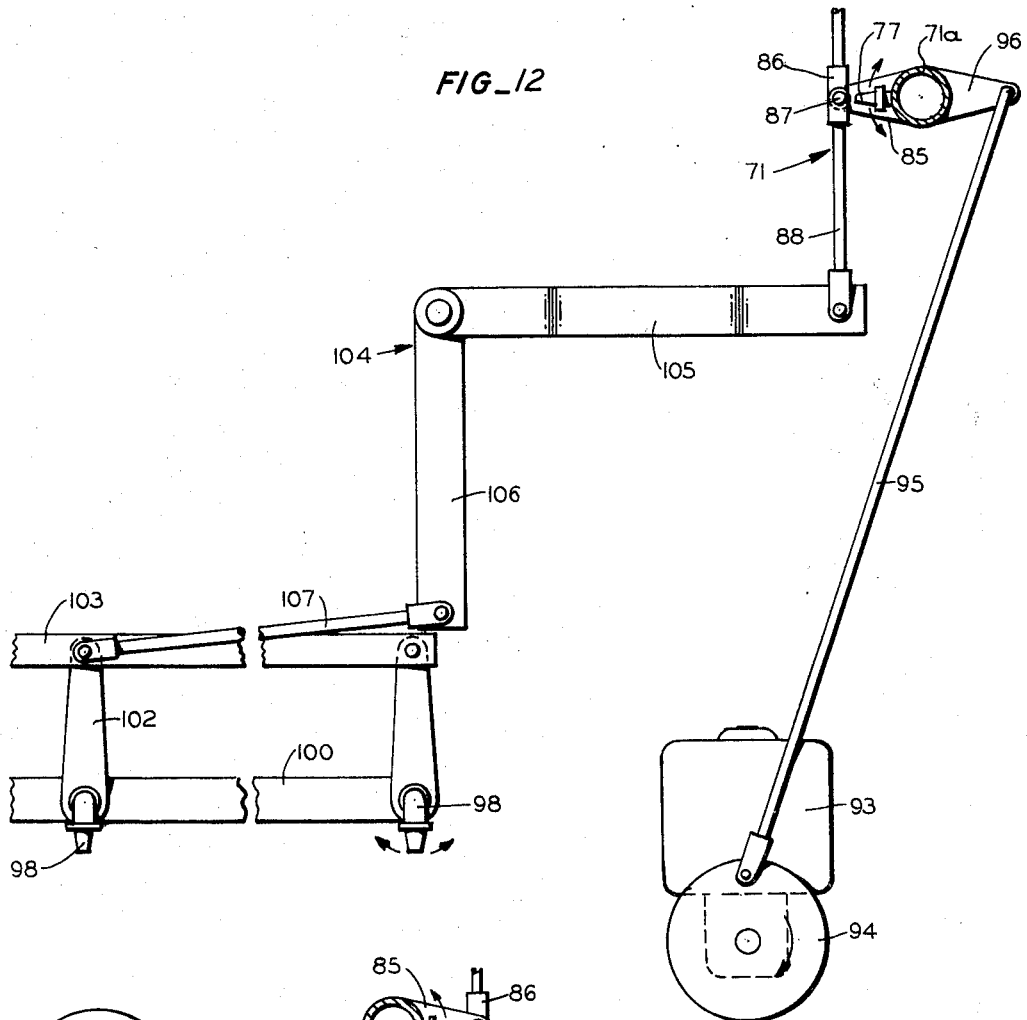
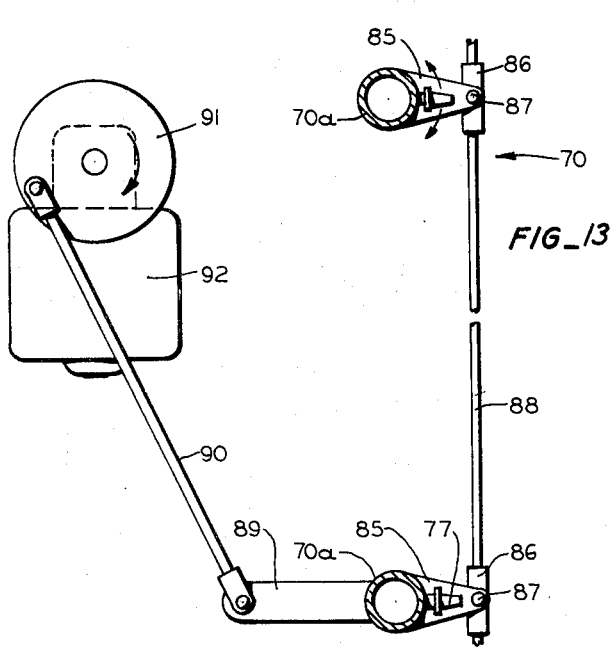
FIG_12
FIG_13
INVENTOR.
MOWATT M. HURST

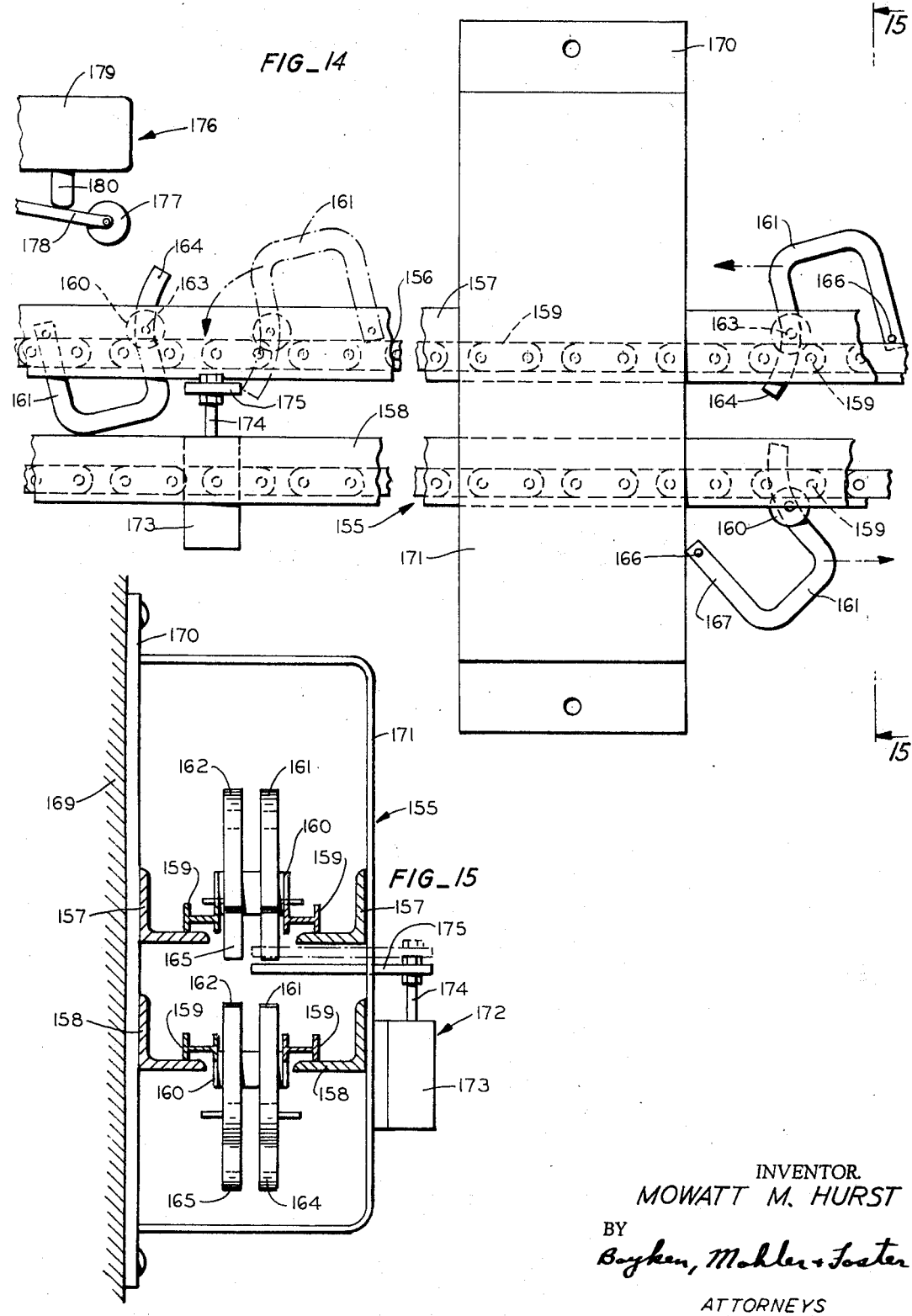

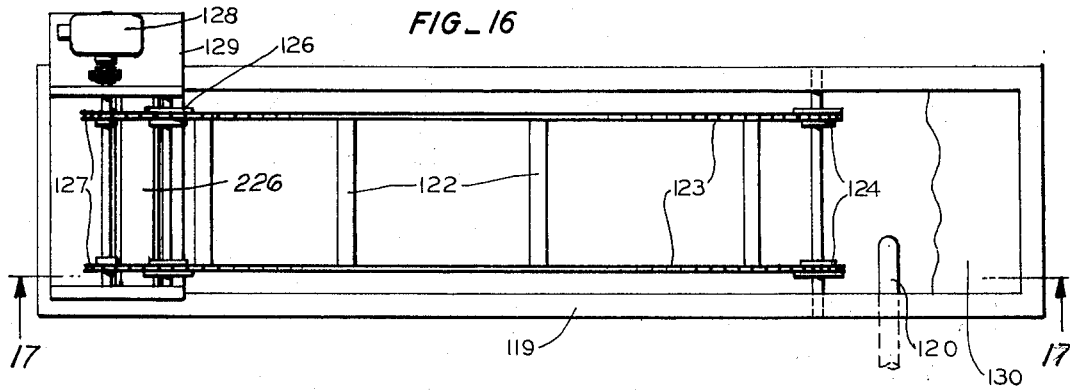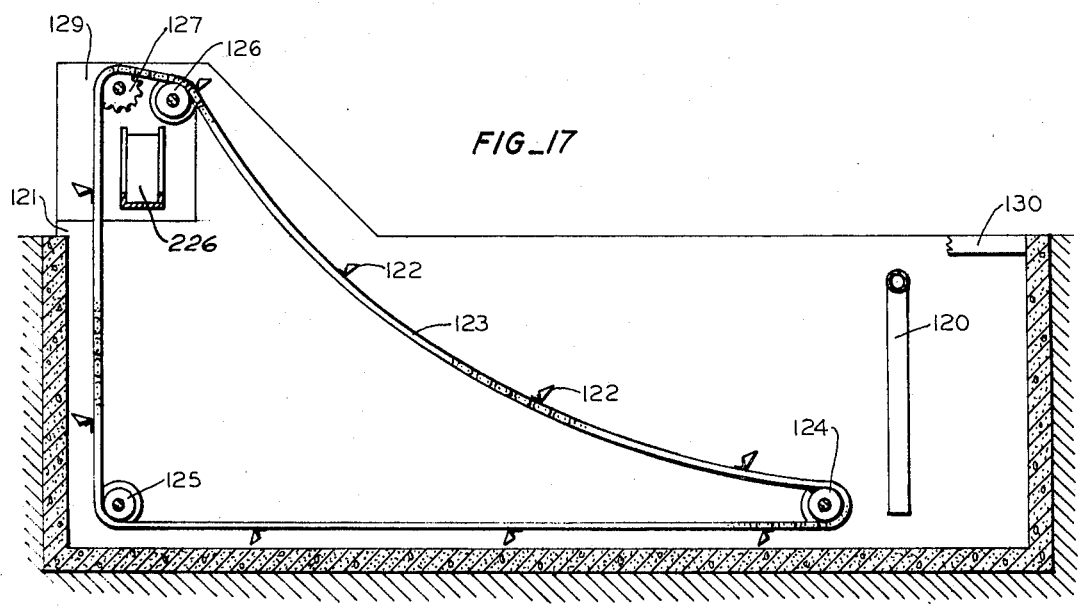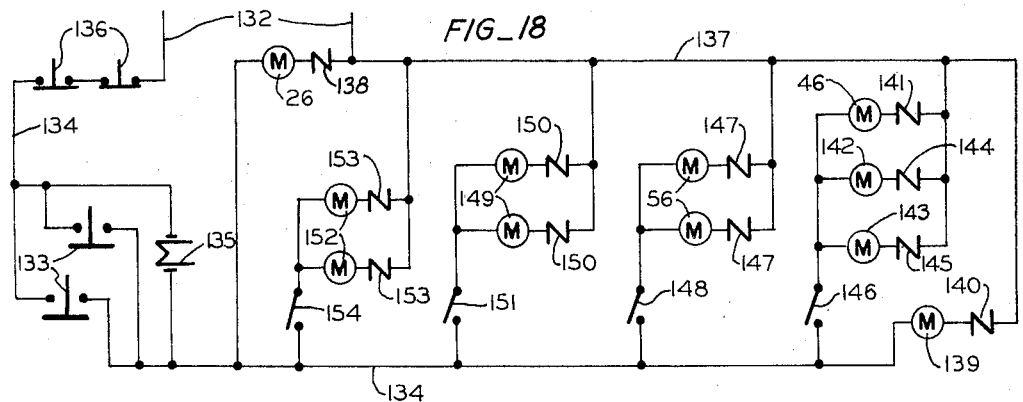

3,432,346
AUTOMOBILE WASHING METHOD
Mowatt M. Hurst, San Carlos, Calif., assignor, by mesne assignments, to S. C. Johnson & Son, Inc., Racine, Wis., a corporation of Wisconsin
Filed Apr. 24, 1963, Ser. No. 275,266
U.S. Cl. 134—34          21 Claims
Int. Cl. B08b *3/02*

This invention relates generally to an automobile washing installation, and more particularly to a method of and apparatus for automatically processing an automobile through the various steps of washing and drying the outer surfaces of the automobile to produce a polishing effect on such surfaces.

Heretofore, many of the so-called "automatic" car washing installations consisted of a plurality of stations, such as rinsing, washing, drying, etc., all of which, or at least some of which, operated continuously while an automobile was being processed through the installation. Such continuous operation required an excessive amount of water and power resulting in increased operating expenses.

Other such installations were not completely automatic, and required attendant personnel to perform such tasks as scrubbing the surfaces of the automobile, especially in such hard to clean areas such as the bumpers and the grill. Some installations relied almost entirely upon mechanical apparatus, such as large rotary brushes, to scrub such surfaces. This often proved to be unsatisfactory because the brushes would tend to scratch or mar the painted or waxed surfaces when in sufficiently close engagement therewith to do a thorough cleaning job, or would not clean such surfaces if spaced therefrom to avoid such marring. These are but a few of the problems confronting such prior installations which the method and apparatus of this invention are intended to overcome.

An object of this invention is to provide a car washing installation comprising a plurality of aligned operating stations each of which is automatically activated and deactivated for intermittent operation only when the car is actually within each respective station.

It is another object of this invention to provide an integrated system for automatically washing and drying the outer surfaces of an automobile whereby the automobile is moved at a uniform rate through a series of operating stations along a path substantially parallel to the axis of the automobile.

A further object is the provision of a method of washing the outer surfaces of a car with streams of a hot detergent solution under high pressure applied in a sweeping motion transversely of the axis of the car.

It is yet another object of this invention to provide a method of washing and polishing the outer surfaces of an automobile without scratching or marring such surfaces, including the step of scrubbing such surfaces with streams of an aqueous solution directed against such surfaces transversely of the axis of the automobile and oscillated in directions substantially parallel to such axis to effect waves of such solution moving across such surfaces.

A still further object is to provide a method of washing the outer surfaces of an automobile by conveying the automobile along a path substantially parallel to the axis of the automobile at a uniform rate through a series of stations, including prerinsing, scrubbing, rinsing, and drying stations, each of which is automatically deactivated when the automobile leaves such station.

Another object is the provision of a method of and apparatus for washing automobiles, whereby automobiles are serially and automatically washed and dried in a predetermined amount of time.

Still a further object of this invention is to provide a car washing installation comprising a plurality of aligned individually operative operating stations which are coordinated by a timing means for automatically processing a car through the installation at a uniform rate.

Another object is the provision of control means for an integrated car wash system fr automatically washing and drying a car with a minimum number of attendant personnel.

Yet a further object is to provide apparatus for and a method of washing an automobile utilizing reclaimed water to polish as well as clean the surfaces of the automobile without scratching or marring such surfaces.

These and other objects and advantages of this invention will become more readily apparent from a consideration of the following description taken in conjunction with the accompanying drawings, in which:

FIG. 1 is a partially broken away plan view of an installation utilizing the apparatus of this invention illustrating the operating stations designated I–VII;

FIG. 2 is a schematic illustration of the pneumatic control system for operating the installation of FIG. 1;

FIG. 3 is a plan view of a portion of Station II of FIG. 1, showing the top means for applying detergent under high pressure;

FIG. 4 is an elevational view taken along the line 4—4 of FIG. 3, showing the means of FIG. 3 traversing the top of an automobile shown in phantom;

FIG. 5 is a plan view taken along the line 5—5 of FIG. 1, showing one of the pair of the side means for applying detergent under high pressure;

FIG. 6 is an elevational view taken along the line 6—6 of FIG. 5;

FIG. 7 is an elevational view, partly in section, taken along the line 7—7 of FIG. 1, showing a portion of the scrubbing means of Station IV;

FIG. 8 is a sectional view taken along the line 8—8 of FIG. 1;

FIG. 9 is a sectional view taken along the line 9—9 of FIG. 7;

FIG. 10 is a schematic diagram illustrating the front and rear scrubbing means of Station IV of FIG. 1;

FIG. 11 is a plan view taken along the line 11—11 of FIG. 10;

FIG. 12 is a partly sectional, partly plan view taken along the line 12—12 of FIG. 7, showing the operating means for the means of FIG. 11;

FIG. 13 is a partly sectional, partly plan view taken along the line 13—13 of FIG. 7;

FIG. 14 is an elevational view of a portion of the timing means taken along the line 14—14 of FIG. 1;

FIG. 15 is a sectional view taken along the line 15—15 of FIG. 14;

FIG. 16 is a plan view of a portion of the water reclaim system utilized with the method and apparatus of this invention;

FIG. 17 is a sectional view taken along the line 17—17 of FIG. 16;

FIG. 18 is a diagram of the automatically actuated electrical circuit utilized with this invention.

In general, the automobile washing installation of this invention is comprised of a plurality of operating stations, designated I through VII in FIG. 1, through each of which an automobile to be washed is moved by conveyor means 20 along a path substantially parallel to the axis of the automobile at a uniform rate.

Station I is a prerinse station in which the automobile is sprayed with a detergent solution under low pressure while at least the sides of the automobile are brushed to clean off heavy accumulated dirt. A brush for brushing the top of the automobile may be optionally provided.

At Station II a hot detergent solution under high pressure is sprayed on the automobile in a sweeping motion transversely across the automobile by nozzles supported to proximately follow the contours of the automobile as it moves along its path.

The wheels of the automobile are washed at Station III by wheel washer means which are actuated to move into engagement with the outwardly facing surfaces of the front pair of tires and to move with the automobile while brushing the tire surfaces and cleaning such surfaces with a hot cleansing agent under high pressure, such as steam. After the front tires are so cleaned, the wheel washing means are automatically actuated to return to their original position and perform the same cleaning procedure on the rear pair of wheels.

Station IV comprises a plurality of scrubbing stations. Each scrubbing station includes opposed sets of nozzles supported to spray an aqueous fluid in streams criss-crossing the path of the automobile. The nozzles are oscillated in directions generally parallel to the path of the automobile to effect waves of the aqueous fluid moving across the side and upper surfaces of the automobile to produce a scrubbing effect. Station IV also includes means for directing sprays of the aqueous fluid against the front and rear surfaces of the automobile without spraying the underside of the automobile, thereby avoiding wetting the electrical system and the brakes.

Station V is a rinsing station utilizing similar apparatus to that of Station IV.

In Station VI a final rinsing operation takes place wherein the surfaces of the automobile are rinsed thoroughly with clean water and the sides of the automobile are brushed to eliminate any caked dirt which may have been left on the sides of the automobile.

The final operation takes place in Station VII wherein the automobile passes initially under a low pressure hot air blower to remove the bulk of the water from the automobile body. Immediately upon leaving the low pressure blower the automobile encounters a high pressure hot air blower to complete the drying operation.

The operation of each of the stations is controlled by means of a timing device which automatically activates each station as the automobile approaches such station and automaticlly deactivates each station when the automobile leaves such station.

The apparatus of this invention is ordinarily enclosed or partially enclosed in a suitable building which is open at both ends to permit entrance of the car into the installation and exit therefrom. FIG. 1 illustrates the apparatus of this invention in plan view as it would appear in a building with portion of the roof removed.

As previously described, the apparatus of this invention is arranged in seven aligned operating stations, designated I through VII, through each of which an automobile to be washed is moved by a conveyor means 20. Conveyor 20 may be any suitable type of commercially available conveyor adapted to move a vehicle through the installation along a path substantially parallel to the axis of the automobile at a uniform rate. The conveyor utilized in the preferred embodiment of this invention is similar to that disclosed in United States Patent No. 3,058,433, dated Oct. 16, 1962. The conveyor 20 is generally recessed within the floor surface of the installation and has a platform 21 (FIG. 8) positioned generally coplanar with such floor surface on which the wheels on one side of the automobile will ride. A rigid guide rail 22 extending parallel to the conveyor 20 along the entire length thereof extends above the platform 21 for engagement with the inwardly facing surfaces of the wheels riding on the platform 21.

The automobile is moved along the platform 21 by means of a plurality of rollers 23 spaced apart longitudinally of endless chains 24, 25. The chains 24, 25 are driven by a suitable motor 26 (FIG. 1) at a desired uniform rate to move the rollers 23, and hence the automobile to be washed, along the platform 21 at such uniform rate.

The end of the conveyor 20 adjacent Station I (FIG. 1) is normally covered by a trap door 20a which is pushed open by each of the rollers 23 to allow the rollers 23 to traverse the platform 21. The automobile 10 is positioned on the platform 21 slightly beyond the trap door 20a, or as seen in FIG. 1, between trap door 20a and Station I. When the conveyor is started, the roller 23 will come up through trap door 20a and contact the left front wheel 11 of the automobile and thus move the automobile through the installation. As the automobile 10 is moved forwardly, the right front wheel of the automobile contacts a treadle 27 which operates a valve (to be later described) for controlling the various operations of Stations I through VII.

STATION I

Station I is a pre-rinse station wherein the automobile 10 is sprayed with a detergent solution under low pressure and the sides and top of the automobile are brushed by side brushes 28 and top brush 29, respectively. Brushes 28 and 29 are securely supported in a frame 30 for rotation about their respective axes. Such rotation is caused by a conventional electric motor (not shown). The brushes are continually rinsed with the detergent solution by nozzles (not shown) to insure that they do not accumulate any of the dirt which is removed from the surfaces of the automobile. The provision of the top brush 29 in the installation is optional, and does not constitute a necessary provision of this invention.

STATION II

Station II includes an upright support member 31 (FIGS. 1, 3) dimensioned to straddle the automobile as it moves along its path. A substantially rectangular frame member 32 is pivotally supported from support member 31 directly above the path of the automobile by means of a rod 33 to allow the frame 32 to pivot in a generally vertical direction.

A nozzle arm 34 is pivotally connected to the rear bar 35 of frame 32 by a pivotal joint connection 36 to permit the arm 34 to be pivotally biased in a substantially horizontal plane between the positions illustrated in FIG. 3. The extent of such pivotal movement is illustrated by the arm 34' shown in dot-dash lines. The free end of arm 34 terminates in a downwardly directed nozzle 37 through which is sprayed a hot detergent solution under high pressure which is fed through the arm 34 and the nozzle 37 by means of a flexible tube 60 (FIG. 4), which is connected to a detergent supply tank (not shown). Securely mounted on the frame 32 and extending longitudinally thereof a pair of spaced parallel arms 38 are securely connected to the frame 32 and have rotatably mounted thereon a front pair of coaxial wheels 39 and a rear pair of coaxial wheels 40. The wheels 39 and 40 are mounted so as to be contacted by an automobile passing through Station II and to ride over the surfaces of the automobile (FIG. 4) to thereby pivotally bias the frame 32 in a substantially vertical plane. A leading pair of wheels 41 are pivotally mounted on one end of a pair of spaced bars 42 which are connected at the opposite end to the rear bar 35 of frame 32 and are supported approximately midway along their length by a rod 43 which is mounted on the front portion of the frame 32.

The nozzle arm 34 and nozzle 37 are oscillated between the positions shown in FIG. 3 by means of a motor driven eccentric arrangement comprising an arm 44 pivotally connected at one end to the arm 34 and at its other end to a fly wheel 45 along the periphery thereof. The fly wheel 45 is mounted on a suitable electric motor 46 which is securely mounted in the frame 32 and connected to the source of electricity (not shown). When the motor 46 is energized, as will be subsequently described, the arm 34 will be oscillated between the position shown in FIG. 3 in a generally horizontal plane to thus describe a sweeping motion transversely across the axis of the automobile to be washed. It will be understood that the arm 34 is oscillated at a rate which is sufficient to allow the nozzle 37 to completely cover the entire top surface of the automobile as it moves along the path. The nozzle 37 is proximately spaced from the upper surface of the automobile by means of the wheels 39, 40, 41. The frame and nozzle assembly are normally biased downwardly about the rod 33 to be positioned directly in the path of the oncoming automobile. As the leading surface of the automobile contacts the pair of wheels 40, the frame 32 will be biased upwardly about the rod 33. The wheels 39, 40, 41 are made of a rubberized or plastic material so as not to mar or scratch the surface of the automobile as they roll across said surface. Thus the nozzle 37 is spaced proximately to the surface of the automobile to deliver the hot detergent solution under high pressure in the sweeping motion as above described. This action tends to loosen the dirt on the surface of the automobile to facilitate cleaning.

FIGS. 5, 6 illustrate the apparatus for applying the hot detergent solution to one side of the automobile. The other side of the automobile is sprayed by identical apparatus.

A frame 47 is pivotally supported from the support member about a substantially vertical axis by a rod 48. A pair of spaced, parallel rollers 49, 50 are mounted on frame 47 for rotation upon contact with the side surfaces of the automobile. The rollers 49, 50 are made of a rubberized or similar material to prevent marring of the surfaces of the automobile.

A nozzle arm 51 is connected to the frame 47 by a pivotal coupling 52 for pivotal movement between the position shown in full lines and that shown in dot-dash lines indicated at 51'. The free end of arm 51 terminates in an inwardly directed nozzle 53 for directing a stream of hot detergent solution under high pressure against the sides of the automobile. The arm 51 and nozzle 53 are oscillated between the positions shown in FIG. 6 by means of a motor driven eccentric arrangement comprising an arm 54 pivotally connected at one end thereof to arm 51 and at the other end thereof to the periphery of a fly wheel 55. A motor 56 is supported on the frame 47 for driving the fly wheel 55.

Upon actuation of the motor 56 the arm 51 and nozzle 53 are oscillated in a substantially vertical plane between the predescribed positions at substantially the same rate as arm 34 and nozzle 36, as previously described to describe an arc extending substantially the height of the average automobile being washed. This oscillation thus described a sweeping movement of the spray of hot detergent solution transversely across the axis of the automobile.

The frame 47 is normally positioned in the path of the automobile as the automobile enters Station II. The roller 49 contacts the front fender of the automobile to pivotally bias the frame 47 outwardly about the rod 48. Roller 49 maintains contact with the side of the automobile as the automobile progresses through the station to thereby maintain the nozzle 53 in spaced, proximate relation to the side of the automobile. When the automobile passes roller 49 the frame 47 will be biased inwardly toward its original position. The roller 50 contacts the trailing side surfaces of the automobile to prevent the nozzle 54 from contacting and marring such surfaces. The roller 50 rolls off such trailing surfaces to position the frame in its original position for contacting the next following automobile through the station.

The hot detergent solution is supplied to the nozzle 53 through a flexible hose 57 (FIG. 5) which is connected at one end thereof to the coupling 52. The detergent solution is heated in a high capacity water heater 58 (FIG. 1) whence it is supplied under high pressure to the hose 57 through a high pressure pump 59 (FIG. 1). A hose 60 (FIG. 4) connects the nozzle 37 to the heater 58 and pump 59 in a similar manner.

The operation of the pump 59 is controlled by a pneumatically operated valve arrangement to be subsequently described. The chemical strength and temperature of the detergent solution should be determined and maintained according to local water conditions for maximum cleaning effect. For example, in a preferred embodiment of the invention, the detergent solution is delivered to the nozzles at a temperature of 110° F. and a pressure of 600 p.s.i. Generally a temperature of approximately 100°–120° F. and a pressure of approximately 500–700 p.s.i. are sufficient under normal operating conditions. The high pressure under which the detergent solution emanates from the nozzles and the proximity of the nozzles to the surfaces of the automobile, coupled with the chemical strength and temperature control of the detergent solution, tend to loosen the dirt and road tar from the surfaces of the automobile.

STATION III

This station is comprised of apparatus for washing the wheels of the automobile. The preferred apparatus to be utilized is illustrated and described in U.S. Patent No. 2,692,214, dated Oct. 19, 1954. However, it will be understood that other conventional wheel washing apparatus may be adapted for use with the present installation.

In general, the wheel washing apparatus illustrated in FIG. 1 comprises a pair of motor driven brush members 61 spaced on opposite sides of the path of the automobile. Each member 61 includes a pair of parallel tracks 62 extending parallel to the longitudinal axis of the installation, that is, along the path of the automobile. The tracks 62 may be mounted on the floor surface of the installation or may be raised from the floor by suitabe support members as required.

A self-powered carriage 63 is supported on tracks 62 for movement therealong at the same rate as the movement of the automobile through the installation. The carriages 63 each include a rotary brush 64 which is adapted to be moved inwardly transversely of tracks 62 into engagement with the outwardly facing surface of the front wheels of the automobile. The carriages 63 also include a steam nozzle (not shown) in communication with a steam generator 65 for applying steam under high pressure against the wheels. The application of the steam plus the rotary action of brushes 64 completely remove the dirt from the wheels.

The operation of the carriages 63 is controlled by a timing mechanism to be subsequently described. The length of the tracks 62 is such that the carriages 63 move a sufficient distance to allow the brushes 64 to completely scrub the outwardly facing surface of the pair of wheels on each axle of the automobile. The front pair of wheels 11 are washed first as the automobile proceeds forwardly through the installation. When the carriages 63 reach the limit of their movement along the tracks 62, a reversing switch (not shown) is tripped to return the carriages to their original position for washing the rear pair of wheels 12. The washing process is repeated for the rear pair of wheels, and at the end of this repeat process the carriages are returned to their original position to await the next automobile to be washed.

During the time the automobile is passing through Station III the detergent solution acts on the dirt and grime on the surfaces of the automobile to facilitate removal of such dirt and grime when the automobile passes through Station IV.

STATION IV

The operation performed at this station is a scrubbing operation wherein the residual detergent solution which has not drained off the automobile is agitated by streams of an aqueous fluid, generally reclaimed water, which are directed against the automobile and oscillated to produce waves of such solution moving across the surfaces of the automobile.

Station IV is comprised of a plurality of aligned substations spaced longitudinally along the path of the automobile.

Each substation has an overhead manifold 69 (FIG. 7) and a pair of parallel side manifolds 70, 71. The overhead manifold 69 consists of a single tubular pipe having a plurality of fixed nozzles 72 mounted therein for directing streams of fluid downwardly on the upper surfaces of the automobile. Each of the side manifolds 70, 71 consists of three vertically extending, parallel, tubular pipes 70a, 70b, 70c and 71a, 71b, 71c, respectively (FIG. 1).

The substations are supported by a frame 67 (FIG. 7) having a pair of parallel, longitudinally extending, right angle, base channel members 68 securely mounted on the floor surface of the installation in a conventional manner. A vertically extending, right angle channel member 73 is positioned adjacent each of the pipes 70a, 70b, 70c, 71a, 71b, 71c, in each substation, and is securely fastened at its lower end to one side of the upstanding flange of the member 68. A pair of parallel, horizontal, longitudinally extending right angle channel members 74 connect the upper ends of members 73 which are securely fastened to the horizontal flanges thereof.

The pipes 70a, 70b, 70c, 71a, 71b, and 71c are each movably supported by the frame 67 by means of a lower collar 75 which is securely fastened to the horizontal flange of the member 68. An upper collar 76 holds each pipe and is securely fastened to the upstanding flange of member 74.

Each of the pipes 70a, 70b, 70c, 71a, 71b, and 71c in each substation has a plurality of vertically aligned nozzles 77 mounted therein and normally directed inwardly transversely across the path of the automobile for directing intersecting streams of an aqueous fluid, such as reclaimed water, across said path.

The aqueous fluid is delivered to the substations from a pump 78 (FIG. 1) through an overhead tubular feed pipe 79 communicating with a longitudinally extending pipe 80 (FIGS. 1, 7) by a T-joint 81. The pipe 80 communicates with each overhead manifold 69 by a T-joint 82.

Each overhead manifold 69 has a pair of tubular T-bars 83 spaced apart at opposite sides thereof. A flexible hose 84 connects each of the pipes 70a, 70b, 70c, 71a, 71b and 71c in fluid communication with T-bars 83 for supplying the aqueous fluid to the nozzles 77.

Each of the pipes 70a, 70b, 70c, 71a, 71b and 71c is pivotally moved about its own axis within the collars 75, 76 by the drive means illustrated in FIGS. 9, 12, 13. Each of the pipes is securely fastened to one end of the arm 85. The other end of the arm 85 is pivotally connected to an internally threaded member 86 by a pin 87. A substantially cylindrical, solid, connecting rod 88 has externally threaded ends engageable with the threaded members for extending between and connecting two successive members. In this manner, all the members in each side manifold 70, 71 are interconnected.

One of the pipes in side manifold 70, such as 70a, preferably an intermediate pipe, is securely connected to one end of a rigid arm 89 (FIG. 13). The other end of arm 89 is pivotally connected to one end of a connecting rod 90, and the other end of rod 90 is pivotally connected to the periphery of a flywheel 91 which is driven by an electric motor 92. Actuation of the motor 92 rotates the flywheel 91 in the direction of the arrow (FIG. 13) to reciprocate the connecting rod 90 due to the eccentric mounting of rod 90 on the flywheel. This reciprocation causes the pipe 70a connected to arm 89 to alternately rotate in clockwise and counterclockwise directions about its axis to thereby oscillate the nozzle 77 and the arm 85 as indicated by the arrows in FIG. 13. Such oscillatory movement is imparted to the connecting rod 88 to reciprocate all the rods 88 in side manifold 70 back and forth. The reciprocating movement of the rods 88 is translated through each arm 85 to oscillate each nozzle 77 in a substantially horizontal plane by rotating each pipe in this side manifold 70. The nozzles 77 thus oscillate in directions generally parallel to the path of the automobile.

The nozzles 77 of the side manifold 71 are oscillated in a similar manner by a motor 93 (FIG. 12) driving a flywheel 94. A connecting rod 95 is pivotally mounted at one end thereof on the periphery of the flywheel 94 for eccentric movement upon rotation of the flywheel. The other end of rod 95 is pivotally mounted to one end of an arm 96 which is secured at its other end to the pipe 71a. The reciprocating movement of rod 95 rotates the pipe 71a in alternate directions about its axis to oscillate the nozzle 77 in the directions indicated by the arrows.

The motors 92, 93 are coordinated so as to oscillate the nozzles 77 in both side manifolds 70, 71 in the same direction at the same time. This oscillatory motion of the nozzles tends to whip the streams of aqueous fluid in the directions of movement of the nozzles, which directions are parallel to the path of movement of the automobile. Since the nozzles are directed inwardly so that the streams of fluid emanating from the nozzles in both side manifolds in each substation will cross, the fluid being sprayed on the top surface of the automobile will effect waves of such fluid moving across such surface.

The aqueous fluid solution generally utilized is water which has been reclaimed by a filtering process (to be later described) and which contains a fine silt composed to tiny particles of dirt or other foreign matter. Such particles appear to produce a polishing effect on the surfaces of the automobile which is far superior to the ordinary cleaning effect provided by fresh water.

The bottom manifold is shown schematically in FIG. 10, and is indicated generally at 97. This manifold is comprised of a plurality of batteries of upwardly inclined forward nozzles 98 and a plurality of batteries of upwardly inclined rear nozzles 99.

The battery of nozzles 98 (FIG. 11) is identical to the battery of nozzles 99, but reversed in position and direction. The following description relating to the nozzles 98 applies also to the nozzles 99.

The nozzles 98 are pivotally mounted in spaced relation along a fixed, tubular pipe 100 (FIG. 11) which connects the entire battery of nozzles in fluid communication with the pump 78 (FIG. 1) through a main feed pipe 101 (FIG. 11). Pipe 101 connects all the nozzles 98 and 99 to the pump 78. The flow of fluid from pipe 101 to pipe 100 is regulated by a diaphragm valve 131 which is normally closed to prevent the flow of fluid to the nozzles in the battery. The diaphragm valve in each battery is individually opened to admit fluid to the nozzles by a control system which will be subsequently described. Each nozzle 98 has one end of an arm 102 securely connected thereto. The other end of the arm 102 is pivotally connected to a bar 103 which extends generally parallel to the pipe 100 and thus connects the ends of all the arms 102 in each battery of nozzles (FIG. 11).

The nozzles 98 in each battery are thus supported to pivot together as a unit when any one of the nozzles is pivoted. The apparatus for so pivoting one battery of nozzles is illustrated in FIG. 12. A right angle toggle lever 104 has one end of arm 105 thereof pivotally connected to the end of connecting rod 88, and an end of arm 106 thereof pivotally connected to one end of a connecting rod 107. The other end of connecting rod 107 is pivotally connected to the end of one of the arms 102 (preferably an intermediate arm) which is connected to the bar 103. When the connecting rod 88 is reciprocated by the motor 93, as previously described, motion is thereby transferred through the toggle lever 104 to the connecting rod 107 and thence to the arm 102 which causes the nozzles 98 to pivot in the directions indicated by the arrows in FIG. 12. The bar 102 is thus caused to reciprocate to thereby cause the nozzles 98 in the battery to be likewise pivoted. Nozzles 98, 99 move transversely of the path of the cars.

The drive mechanism just described is connected to only one battery in the bottom manifold, preferably the middle battery, which will hereinafter be referred to as the driving battery. The remaining batteries, or driven batteries, in the manifold are driven off the driving battery by means of chains 108, 109 (FIG. 11) extending the length of the bottom manifold. Chain 108 is securely connected to a lever arm 110 which is integrally connected to an intermediate arm 102 in the battery. Each of the batteries in the manifold has a similar arm 110 with the chain 108 connecting all of the arms 110. Chain 108 connects with chain 109 around a pair of pulleys 111, 112 supported in a conventional manner at opposite ends of the manifold. Chain 109 is not connected to the arms 110 and is free to move in the opposite direction to the movement of chain 108. Thus chains 108, 109 cooperate to alternately pull the arms 110 in opposite directions.

When the bar 103 is moved to the left, as seen in FIG. 11, the arm 110 will be pivoted in a counterclockwise direction to pull the chain 109 downwardly and hence move the arms 110 in the driven batteries in a counterclockwise direction. Such movement of the arms 110 will move the bars 103 in the driven batteries to pivot the nozzles in a counterclockwise direction, as previously described. Movement of bar 103 to the right, as seen in FIG. 11, causes the nozzles to be pivoted in the opposite or clockwise, direction. Thus it is seen that the nozzles in the bottom manifold 97 lie in the path of the automobile and are pivoted by the drive means for the side manifold 71 to spray streams of reclaimed water transversely across the front and rear surfaces of the automobile.

The spraying of reclaimed water by the bottom manifold produces the same polishing effect on the front and rear surfaces of the automobile as to the side manifolds on the side and upper surfaces.

STATION V

Station V is shown in FIG. 1 as a portion of Station IV. In practice, the apparatus of this station is similar to that of Station IV, with the exception that the nozzles are stationary. Reclaimed water is pumped to the station by a pump 113 to rinse residual detergent solution from the surfaces of the automobile.

STATION VI

This station is comprised of apparatus for giving the surfaces of the automobile a final rinse with fresh water. A plurality of nozzles (not shown) are arranged in a frame 114 (FIG. 1) to direct sprays of water against the surfaces of the automobile. A pair of rotary brushes 115 are supported on the frame 114 to brush the sides of the automobile to insure that all the caked dirt which tends to accumulate on the side surfaces is removed. The brushes are continually sprayed with fresh water from external nozzles (not shown) to reduce the hazard of marring the surfaces of the automobile.

STATION VII

This station is a drying station and is comprised of a low pressure, hot air blower 116 and a high pressure, hot air blower 117 (FIG. 1). The blowers 116, 117 may be of a conventional type, and are preferably similar to the type described in U.S. application, Ser. No. 830,305, filed July 29, 1959, now Patent No. 3,085,351.

Both blowers 116, 117 are normally positioned in the path of the automobile and are adapted to be biased out of the path upon contact with the automobile. Suitable hot air nozzles having movable baffles or ducts (not shown) for controllably directing the blasts of hot air and mounted on rollers (not shown) traverse the surfaces of the automobile in proximate relation to such surfaces to completely dry the automobile.

A conventional counter mechanism 118 (FIG. 1) may be positioned between Station VI and Station VII to count the number of automobiles being processed through the installation.

FIGS. 16, 17 illustrate a portion of a water reclaim system which in practice may supply reclaimed water to the installation. An underground settling tank 119 has a drain pipe 120 communicating with one of the stations above described, as for example, Station IV. The water which drains from Station IV contains particles of dirt and some detergent solution washed off the automobile. This water drains into the tank 119 until it flows over the edge of the tank indicated at 121 (FIG. 17). The dirt will settle on the bottom of the tank, and is scooped out of the tank by a plurality of scoops 122 carried by a pair of endless chains 123 along the bottom of the tank. The chains 123 are supported for movement on pairs of coaxial rollers 124, 125, 126, respectively, and are driven by a pair of coaxial gears 127 connected to a motor 128. A housing 129 covers the motor 128, gears 127 and rollers 126, and carries a transversely extending chute 226 for discharging the dirt ejected from scoops 122. The lower edge of housing 129 is spaced from the edge 121 of tank 119 to permit the water to overflow. The upper open portion of the tank is normally covered by a suitable cover 130 to control the overflow and to act as a safety precaution. The cover 130 is shown broken away to show the interior details of the tank.

Ordinarily one such tank 119 is required for each of Stations II, IV and V; however, tanks may be added or subtracted as needed. The tanks need to be operated only periodically depending upon the amount of water used by the installation. Normally the tanks should be cleaned out every day, preferably in the morning, before opening the installation for business to allow the sediment to settle to the bottom of the tank overnight.

CONTROL SYSTEM

The control system for automatically actuating the aforedescribed apparatus of this invention is comprised of an electrical subsystem, a pneumatic subsystem, and a timing mechanism for actuating both the electrical and pneumatic subsystems.

The electrical subsystem is illustrated in FIG. 18 which shows only the electrical circuit which is automatically actuated by the timing mechanism. Some of the apparatus above described is operated by manually actuated electric motors which are wired in a conventional manner and need not be herein described.

The circuit (FIG. 18) is connected to a source of electrical energy indicated at 132. The circuit is closed by closing either one of a pair of normaly open start switches 133 which are connected in parallel to each other and connected to source 132 by line 134. The start switches 133 are preferably of a spring type which reopen as soon as released. In order to maintain a closed circuit, there is provided a magnetic holding coil 135 connected in parallel to switches 133. The closing of one switch 133 causes the coil 135 to be energized and maintain the circuit after the switch 133 reopens.

A pair of normally closed stop switches 136 are connected in series to each other and are positioned in line 134 between source 132 and start switches 133. Stop switches 136 are also of a spring type, so that when one of the switches 136 is opened to break the circuit, it will immediately reclose when released.

The motor 26 (FIGS. 1, 18) for driving the conveyor 20 is positioned in line 137 and connected in series between the terminals of source 132 to operate constantly when switch 133 is closed. An overload switch 138 is operably connected to motor 26 to protect against overloading and burning out the motor.

A motor 139 and overload switch 140 are provided for driving the pump 59 for Station II. Connected in parallel between lines 134, 137 are the motor 46 and overload switch 141 for the top nozzle 37 in Station II, and the motors 142, 143, and overload switches 144, 145, respectively, for the side brushes of Station I. The motors 46, 142 and 143 are actuated into operation by the closing of a water pressure switch 146, which is closed by the pneumatic system, to be later described.

Connected in parallel to motors 46, 142, 143 are motors 56 and overload switches 147 for operating the side nozzles 53 of Station II. Motors 56 are actuated by the closing of water pressure switch 148 in the same manner as switch 146.

A pair of motors 149 and respective overload switches 150 are connected between lines 134, 137 for operating the wheel washers of Station III. A switch 151 for actuating motors 149 is positioned on the brush members 61 (FIG. 1) to be contacted by the automobile when it reaches Station III.

Connected in parallel to motors 149 are a pair of motors 152 and overload switches 153 for operating the side brushes 115 (FIG. 1). Motors 152 are actuated by closing a water pressure switch 154 which is similar to switch 146.

Some of the apparatus of the present installation is continuously operated for simplicity and economy of operation. For example, the apparatus of Station IV is manually actuated by a conventional start-stop switch (not shown) to provide for continuous movement of the nozzles in the station, as previously described. However, the flow of water through the nozzles, and especially in the bottom manifold, is controlled by a pneumatic system illustrated in FIG. 2, which is in turn controlled by mechanical timing apparatus.

The timing mechanism is indicated generally at 155 (FIGS. 1, 14, 15) and comprises an endless timing chain 156 extending the length of and parallel to the path of the automobile. Chain 156 is driven by a manually actuatable electric motor 225 (FIG. 1) which is suitably rated to drive chain 156 at the same rate as the conveyor 20.

The chain 156 is supported for movement on spaced pairs of parallel angle members 157, 158, respectively, by pairs of elongated runners 159 which are adapted to slide along the horizontal flanges of the angle members. The runners extend outwardly from support frames 160 which are linked together to form the chain 156. Each frame 160 pivotally supports thereon a pair of spaced, substantially U-shaped cams 161, 162 by means of a pin 163 extending through the legs 164, 165, respectively, of cams 161, 162. Similar pairs of cams are spaced along the length of chain 156.

The cams 161, 162 are mounted on the frame 160 to be normally carried in a generally upright position while traversing the upper angle members 157. A pin 166 is securely attached to and extends outwardly from the other legs 167, 168, respectively, of cams 161, 162 to engage the upper surface of the chain 156 for maintaining the upright position of the cams.

The angle members 157, 158 are supported along a wall 169 of the installation by a plurality of spaced, flat plates 170 each of which is securely attached to the wall 169 and has securely attached thereto a bracket 171.

A tripping mechanism 172 is positioned in juxtaposition to chain 156 adjacent Station I (FIG. 1). The mechanism 172 comprises a valve 163 which is actuated by means to be subsequently described. A plunger arm 174 is connected at one end thereof to valve 173 and has a trip-bar 175 securely connected to the other end thereof. The bar 175 is normally in a raised position indicated by the dot-dash lines in FIG. 15, and extends into engagement with leg 164 of cam 161. Such engagement causes the cam 161 to be pivoted about the pin 163 in the direction of the arrow in FIG. 14 and to be lowered into a trailing position.

When the valve 163 is actuated, the bar 175 is lowered to the position shown in full lines in FIG. 15 to allow cam 161 to remain in the upright position. When cam 161 is in the upright position it will contact a pneumatic valve arrangement 176 which is provided at each of the stations for controlling the operation thereof, as will be later explained. The valve arrangement 176 comprises a contact roller 177 rotatably mounted on a pivotal contact arm 178. The arm 178 is supported to be pivotally biased upwardly to actuate a valve 179 by depressing button 180 when roller 177 is contacted by the curved, leading edge of cam 161.

The chain 156 moves continuously during the operation of the installation, and when no automobiles are being processed through the installation the bar 175 remains in the raised position to trip each cam 161 as it passes by the tripping mechanism 172. When an automobile contacts the treadle 27 (FIG. 1), the pneumatic valve 173 is actuated to lower the bar 165 which allows the corresponding cam 161 to remain upright for contacting the valve arrangement 176 for each succeeding station. When the front wheel of the automobile has passed the treadle 27, the air supply to the treadle is cut off, thereby deactivating valve 173 so that the rear wheel of the automobile does not actuate the tripping mechanism. Thus, all of the succeeding cams 161 will be tripped until the front wheel of the next automobile to be washed contacts the treadle 27, with only the cam 161 which corresponds to the automobile being washed remaining upright throughout the length of its travel through the installation. Of course, such corresponding cam drops below the chain 156 when the direction of movement of the chain is reversed at the end of the timing mechanism adjacent Station VII (FIG. 1).

The pneumatic subsystem for turning the water on and off is shown diagrammatically in FIG. 2. Air under pressure is supplied from an air compressor 181 (FIG. 1) to the entire substation through a main feed line 182 (FIG. 2). A treadle pilot valve 183 is actuated by the front wheel of an automobile passing over treadle 27 (FIG. 1) to actuate a spool valve 184 which lowers the tripping mechanism 172, thus allowing the corresponding cam 161 to remain in the upright position, as previously described.

The cam 161 contacts a pilot valve 227 which deactivates spool valve 184 to again raise the tripping mechanism 172 and a pilot valve 185 which reverses spool valve 186 to cut off the air supply to the treadle pilot valve 183 to prevent valve 183 from being actuated by the rear wheel of the automobile. A pilot valve 187 for reversing spool valve 186 and resupplying air to valve 183 is located a sufficient distance from valve 185 to allow the rear wheel of the longest automobile likely to be encountered to pass the treadle 27 before valve 187 is contacted by cam 161. Thus, valve 183 is ready for the next automobile to be washed.

Each of the Stations I, II, IV, V, VI and VII is controlled by a separate but similar pneumatic valve arrangement comprising an "on" and an "off" pilot valve, a reversible spool valve, and a diaphragm valve.

The valve arrangement for the pre-rinsing operation of Station I comprises an "on" pilot valve 188 which is contacted by the cam 161 to actuate spool valve 189 thereby actuating diaphragm valve 190 to turn on the water. When the automobile has passed through the station, cam 161 contacts the "off" pilot valve 191 to reverse spool valve 189 and diaphragm valve 190 to shut off the water.

The detergent-applying operation of Station II is initiated when the cam 161 contacts "on" pilot valve 192 to actuate spool valve 193, thereby actuating diaphragm valve 194 to permit the flow of hot detergent solution through the top and side nozzles 37, 53, respectively (FIGS. 3, 5). The cam 161 subsequently contacting "off" pilot valve 195 reverses spool valve 193 and diaphragm valve 194 to shut off the flow of detergent solution to the nozzles.

In practice it oftentimes proves to be more economical and less complicated to have the fluid flowing continuously through the nozzles in the overhead and side manifolds of Station IV during the operation of the installation. However, the fluid flowing through the nozzles of the bottom manifold 97 (FIG. 10) must be turned on and off to prevent wetting the underside of the automobile, as previously explained. Therefore, provision is made for controlling only the bottom manifold, although similar provisions may be made for so controlling the overhead and side manifolds, if desired. Thus, in the bottom manifold, each battery 98, 99 is controlled by a separate valve arrangement comprising an "on" pilot valve 196, a reversible spool valve 197, a diaphragm valve 131 (FIGS. 2, 11), and an "off" pilot valve 198.

The operation of Station V is similarly controlled by "on" pilot valve 199, a reversible spool valve 200, a diaphragm valve 201, and an "off" pilot valve 202.

Likewise, Station VI is controlled by an "on" pilot valve 203, a reversible spool valve 204, a diaphragm valve 205, and an "off" pilot valve 206.

The blast gates or movable air ducts (not shown) of blower units 116, 117 (FIG. 1) of Station VII are operated by a similar arrangement for directing blasts of hot air on the surfaces of the automobile. The ducts of low pressure blower 116 are moved by an "on" pilot valve 207, a reversible spool valve 208, a diaphragm valve 209, and an "off" pilot valve 210. Similarly, the ducts of high pressure blower 117 are moved by an "on" pilot valve 211, a reversible spool valve 212, a diaphragm valve 213, and an "off" pilot valve 214.

The water pressure switches 146 and 148, and 154 (FIG. 18) in the electrical system are opened and closed by the spool valves 193 and 208, respectively, by conventional coupling means (not shown) to operate the electrical system, as previously described.

The pneumatic system also has provisions for accommodating automobiles having such articles as baggage racks or other obstacles attached to their top surfaces. In such instances each station having an overhead element is provided with an pneumatic valve arrangement for raising such overhead element a sufficient distance to clear the obstacle. This valve arrangement is shown above line 182 in FIG. 2.

The valve arrangement is operated by a manually actuatable pilot valve 215 which actuates a reversible spool valve 216 to trip cam 162 in tripping mechanism 155 (FIGS. 14, 15) by means of air cylinder 217. The cam 162 operates in the same manner as cam 161, remaining in an upright position along the entire length of the timing mechanism and contacting valve arrangements similar to 176 (FIG. 14) to actuate the valves at each station having an overhead element. A pilot valve 218 is contacted by cam 162 to reverse spool valve 216 and deactivate air cylinder 217.

The stations having overhead elements are Stations I, II and VII. Each valve arrangement 219, 220 and 221, 222, respectively, for the stations comprises an "on" pilot valve, a reversible spool valve, a diaphragm valve, and an "off" pilot valve. Each valve arrangement operates in the same manner as the previously described valve arrangements for raising and lowering the corresponding overhead elements. It will be observed that inasmuch as the blower units 116, 117 are each independently operated, a separate valve arrangement 221 and 222, respectively, is provided for each unit.

Thus, there has been herein described and illustrated an automobile washing installation and method for automatically processing an automobile through the various steps of washing, polishing and drying the automobile surfaces with virtually all possibility of scratching or marring such surfaces being eliminated. It will be understood that the installation is not limited to the precise structural arrangement illustrated, but that various changes may be made within the skill and understanding of persons skilled in the art without departing from the spirit and scope of the invention as defined in the appended claims.

For example, during the season when mud may accumulate under the car, controls for spray nozzles 97, 98 may be adjusted to permit spraying below the car to clean off the mud.

I claim:
1. The method of washing the upper surface of an automobile that includes the steps of:
    (a) moving said automobile lengthwise of said automobile in one direction in a substantially horizontally extending path:
    (b) impinging said upper surface with a downwardly directed jet of a cleaning liquid; and
    (c) moving the point of discharge of said jet back and forth across said upper surface in a direction transversely of the length of said automobile along an arcuate path in a substantially horizontal plane simultaneously with movement of said automobile in said one direction whereby said upper surface will be periodically swept by said jet, the rate of movement of said point of discharge of said jet being sufficient to allow said jet to completely cover all of said upper surface of said automobile with said liquid as said automobile is moved along said path past said jet.

2. In the method as defined in claim 1:
    (d) maintaining the point of discharge of said jet at a substantially uniform distance from said upper surface irrespective of changes in the elevation of said surface above the ground whereby said jet will impinge the upper surfaces of said automobile such as the upper surfaces of the hood, main body and rear deck with substantially equal force during said movement of said automobile in said one direction and during movement of said point of discharge of said jet transversely over said upper surface.

3. The method as defined in claim 1, including the steps of:
    (d) discharging sprays of fluid from opposite sides of said path toward each other and across said upper surface to engage fluid on said upper surface during said movement of said automobile in said one direction;
    (e) moving said sprays back and forth in directions generally parallel with said path to effect waves of said fluid moving across said upper surface.

4. The method of washing the oppositely outwardly facing lateral side surfaces of an automobile that includes the steps of:
    (a) moving said automobile lengthwise of said automobile in one direction in a horizontally extending path;
    (b) impinging said side surfaces with laterally directed jets of cleaning liquid; and
    (c) automatically moving the points of discharge of said jets generally vertically back and forth across said side surfaces along paths in substantially vertical planes simultaneously with movement of said automobile in said one direction whereby said side surfaces will be periodically swept by said jets, the rate of movement of said points of discharge of said jets being sufficient to allow said jets to completely cover said side surfaces of said automobile with said liquid as said automobile is moved along said path past said jets.

5. In the method as defined in claim 4:
    (d) maintaining the points of discharge of said jets at substantially uniform distances from said side surfaces irrespective of changes in the contours of said side surfaces whereby said jets will impinge said side surfaces of said automobile with substantially equal force during said movement of said automobile in said one direction and during movement of said points of discharge of said jets over said side surfaces.

6. The method as defined in claim 4, including the steps of:
    (d) then discharging sprays of fluid from opposite sides of said path toward each other and against said side surfaces during said movement of said automobile in said one direction;

(e) moving said sprays back and forth in directions generally parallel with said path to effect waves of said fluid moving across said surfaces.

7. The method of washing the upper and oppositely outwardly laterally directed side surfaces of an automobile that comprises the steps of:

(a) moving said automobile lengthwise of said automobile in one direction in a substantially horizontally extending path;

(b) impinging said upper surface and said side surfaces with jets of cleaning liquid respectively directed downwardly toward said upper surface and laterally toward said side surfaces;

(c) moving the points of discharge of said jets back and forth along predetermined arcuate paths extending transversely of the path along which said automobile is being moved in planes substantially parallel to the surfaces upon which said cleaning liquid is impinging during said movement of said automobile to completely wet said upper surface and said side surfaces by the time said automobile has moved past said jets in said one direction.

8. The method as defined in claim 7, including:

(d) then discharging sprays of fluid from opposite sides of said path toward each other and against said side surfaces and across said upper surface to engage said upper surface from predetermined points spaced from said automobile substantially uniform distances during said movement of said automobile in said one direction past said points;

(e) moving said sprays ejected from said points back and forth in directions generally parallel with said path of movement of said automobile past said points to effect waves of said fluid moving across said surfaces and thereby thoroughly wash said cleaning liquid and the impurities loosened thereby from said automobile.

9. In the method as defined in claim 7:

(d) maintaining the points of discharge of said jets at substantially uniform distances from said surfaces irrespective of the contours of said surfaces whereby said jets will impinge said surfaces of said automobile with substantially equal force during said movement of said automobile in said one direction and during movement of said points of discharge of said jets over said surfaces.

10. The method of washing an automobile that comprises the steps of:

(a) moving said automobile in one direction on a horizontally extended path with the longitudinal axis of said automobile substantially parallel with said path whereby one end of said automobile will be the leading end and the opposite end the trailing end;

(b) discharging jets of a fluid angularly upwardly and rearwardly relative to said direction of movement of said automobile at points below and spaced across and longitudinally along said path before said automobile reaches said points whereby the fluid of said jets will progressively engage and move downwardly across the entire forwardly facing surface of the leading end of said automobile as said automobile is moving on said path in said one direction and past said points; and (c) discontinuing said discharge of said jets as said leading end reaches each of said points and after said jets have impacted substantially the entire forwardly facing surface of said leading end whereby the under surfaces of said automobile will be free from engagement by said fluid as said automobile passes across each of said points during said movement on said path in said one direction.

11. In the method as defined in claim 10, including the step of:

(d) moving said jets of fluid back and forth transversely of said path during said step of discharging said fluid against the forwardly facing surface of said automobile.

12. The method of washing an automobile that comprises the steps of:

(a) moving said automobile in one direction on a horizontally extending path with the longitudinal axis of said automobile substantially parallel with said path whereby one end of said automobile will be the leading end and the opposite end will be the trailing end;

(b) commencing the discharge of jets of a fluid angularly upwardly and forwardly relative to said direction of movement of said automobile at points below and spaced across and longitudinally along said path substantially upon said trailing end reaching each of said points, whereby the fluid of said jets will progressively engage and move upwardly across the entire rearwardly facing surface of said trailing end as said automobile is moving on said path in said one direction and past said points and whereby the fluid of said jets will not engage the downwardly facing surface of the under side of said automobile that has already passed said points; and (c) maintaining said discharge of said jets at least until said automobile has passed each of said points and said jets have impacted the entire rearwardly facing surface of the trailing end of said automobile.

13. In the method as defined in claim 12:

(d) moving said jets of fluid back and forth transversely of said path during said step of discharging said fluid against the rearwardly facing surface of said automobile.

14. The method of washing an automobile that includes the steps of:

(a) moving said automobile lengthwise of said automobile in one direction on a horizontally extending path of travel;

(b) discharging a plurality of front cleaning jets of a fluid angularly upwardly in a direction opposite to said direction of movement of said automobile from points below and spaced across and longitudinally along said path at times when the leading forwardly facing surface of said automobile will be engaged by said jets during movement of said leading forwardly facing surface in said one direction;

(c) discharging a plurality of jets of fluid angularly upwardly in the direction of movement of said automobile from points below and spaced across and longitudinally along said path at times when the trailing rearwardly facing surface of said automobile will be engaged by said jets during movement of said trailing rearwardly facing surface of said automobile in said one direction; and (d) discontinuing the discharge of each of said jets of fluid during the passage of said automobile over the point of discharge thereof when fluid from each of said jets would impinge against the under surfaces of the automobile between the ends thereof.

15. The method of washing the outer surfaces of an automobile comprising the steps of:

(a) moving said automobile at a uniform rate in one direction on a path substantially parallel with the longitudinal axis of said automobile;

(b) wetting the front, rear, upper and side outer surfaces with a solution and substantially simultaneously brushing at least said side outer surfaces;

(c) then discharging sprays of a cleaning liquid against said upper and side outer surfaces of said automobile from jets while moving said jets back and forth over said surfaces along arcuate paths extending transversely of said longitudinal axis in planes substantially parallel to the surfaces of said automobile against which said sprays are discharged;

(d) after said wetting step, discharging sprays of an aqueous fluid angularly upwardly against said front and rear outer surfaces of said automobile from jets positioned below and spaced across and longitudinally along said path while oscillating said jets back and forth to effect a sweeping of said sprays across said front and rear surfaces transversely of said one direction;

(e) then rinsing said surfaces; and (f) finally drying said surfaces.

16. The method as defined in claim 15, including the steps of:

(g) precluding the application of said solution against the under surfaces of said automobile during the application of said sprays against said front and rear outer surfaces by discontinuing the discharge of said sprays while said automobile is positioned thereabove.

17. The method as defined in claim 15, including the step of:

(g) discharging said sprays against said top and side outer surfaces of said automobile at substantially uniform pressures by maintaining said jets at substantially uniform distances from said surfaces during said movement of said automobile in said one direction and during said movement of said jets over said surfaces.

18. The method as defined in claim 15, including the step of:

(g) washing the wheels of said automobile by moving wheel washing means into contact with the outwardly facing surfaces of said wheels and maintaining said means in contact therewith a sufficient time to entirely clean said wheels by moving said means parallel to said path at said rate for a predetermined distance along said path.

19. The method as defined in claim 15, including the step of:

(g) after completion of said top and side spraying step and before said rinsing step, spraying said outer surfaces with streams of an aqueous fluid from nozzles disposed above the level and along opposite sides of said path and oscillating said streams in directions generally parallel to said path to effect waves of said aqueous solution moving across said outer surfaces.

20. The method as defined in claim 19, in which:

(h) said discharging of sprays of an aqueous fluid against said front, rear, upper and side outer surfaces of said automobile polishes said surfaces by virtue of a polishing agent contained in said aqueous fluid.

21. The method of washing the outer surfaces of an automobile comprising the steps of:

(a) moving said automobile at a uniform rate in one direction on a path substantially parallel with the longitudinal axis of said automobile;

(b) wetting the front, rear, upper and side outer surfaces of said automobile with a solution and substantially simultaneously brushing at least said side outer surfaces;

(c) then discharging sprays of a liquid against said upper and side outer surfaces of said automobile from jets while moving said jets back and forth over said surfaces in directions transversely of said one direction along arcuate paths in planes substantially parallel to the surfaces of said automobile against which said sprays are discharged;

(d) also after said wetting step, discharging sprays of an aqueous fluid containing a polishing agent angularly upwardly against said front and rear outer surfaces of said automobile from jets positioned below and longitudinally along said path while oscillating said jets to effect a sweeping of said sprays across said front and rear surfaces transversely of said one direction to polish said front and rear outer surfaces while precluding the application of said fluid against the under surfaces of said automobile by discontinuing the discharge of said sprays while said automobile is positioned thereabove;

(e) then spraying said top and side outer surfaces with streams of an aqueous fluid containing a polishing agent from jets disposed above and along opposite sides of said path and oscillating said streams in directions generally parallel to said path to effect waves of said aqueous fluid on said outer surfaces and to polish said outer surfaces;

(f) then rinsing said surfaces; and (g) finally drying said surfaces.

References Cited

UNITED STATES PATENTS

| | | | |
|---|---|---|---|
| 1,866,197 | 7/1932 | Cunningham | 134—123 |
| 1,908,788 | 5/1933 | Pulliam | 15—21 |
| 1,934,494 | 11/1933 | Gillespie | 134—7 |
| 1,942,653 | 1/1934 | Kiggins | 15—21 |
| 2,321,983 | 6/1943 | Brackett | 15—21 |
| 2,419,397 | 4/1947 | Frohoff et al. | 134—123 |
| 2,658,216 | 11/1953 | Shusett et al. | 15—21 |
| 2,692,214 | 10/1954 | Hurst | 134—6 |
| 2,830,311 | 4/1958 | Vizdos | 15—21 |
| 2,922,173 | 1/1960 | Lind et al | 134—123 XR |
| 2,936,770 | 5/1960 | Emanuel | 134—123 |
| 3,060,473 | 10/1962 | Vani. | |
| 3,134,117 | 5/1964 | Frank et al. | |

MORRIS O. WOLK, *Primary Examiner.*

JOSEPH T. ZATARGA, *Assistant Examiner.*

U.S. Cl. X.R.

134—6, 32, 36, 123